(12) United States Patent
Ravindar et al.

(10) Patent No.: US 10,521,207 B2
(45) Date of Patent: Dec. 31, 2019

(54) COMPILER OPTIMIZATION FOR INDIRECT ARRAY ACCESS OPERATIONS

(71) Applicant: International Business Machines Corporation, Armonk, NY (US)

(72) Inventors: Archana Ravindar, Bangalore (IN); Satish Kumar Sadasivam, Tamilnadu (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/992,611

(22) Filed: May 30, 2018

(65) Prior Publication Data

US 2019/0369973 A1    Dec. 5, 2019

(51) Int. Cl.
| | | |
|---|---|---|
| *G06F 9/44* | (2018.01) | |
| *G06F 9/30* | (2018.01) | |
| *G06F 11/10* | (2006.01) | |
| *G06F 17/30* | (2006.01) | |
| *G06F 8/41* | (2018.01) | |
| *G06F 9/52* | (2006.01) | |
| *G06F 17/50* | (2006.01) | |
| *G06F 21/52* | (2013.01) | |

(52) U.S. Cl.
CPC ............ *G06F 8/4434* (2013.01); *G06F 8/443* (2013.01); *G06F 8/4441* (2013.01); *G06F 8/4442* (2013.01); *G06F 9/526* (2013.01); *G06F 17/5045* (2013.01); *G06F 21/52* (2013.01)

(58) Field of Classification Search
CPC ............ G06F 12/0862; G06F 12/0284; G06F 12/1416; G06F 8/4442; G06F 8/443; G06F 9/30036; G06F 9/30029; G06F 9/30; G06F 9/30; G06F 9/526; G06F 9/38; G06F 21/52; G06F 17/5045; G06F 8/4441

See application file for complete search history.

(56) References Cited

U.S. PATENT DOCUMENTS

| | | | | |
|---|---|---|---|---|
| 5,926,642 | A  * | 7/1999 | Favor ........................ | G06F 7/74 712/1 |
| 7,539,844 | B1 * | 5/2009 | Ekanadham ........ | G06F 12/0862 711/137 |
| 9,256,552 | B2 * | 2/2016 | Epstein ............... | G06F 12/1416 |

(Continued)

OTHER PUBLICATIONS

P.R. Panda et al., Data and memory optimization techniques for embedded system, Apr. 2001, [Retrieved on Aug. 4, 2019]. Retrieved from the internet: <URL: https://dl.acm.org/citation.cfm?id=375978?> 58 Pages (149-206) (Year: 2001).*

(Continued)

*Primary Examiner* — Anibal Rivera
(74) *Attorney, Agent, or Firm* — Patterson + Sheridan, LLP

(57) ABSTRACT

Systems, methods, and computer program products relating to compiling source code to reduce memory operations during execution. A compiler receives source code. The compiler identifies an indirect access array operation in the source code. The compiler generates replacement code for the indirect access array operation. The replacement code includes a mask array and a union data structure. The compiler generates modified code. The modified code modifies the source code to include the replacement code in place of the indirect access array operation.

20 Claims, 9 Drawing Sheets

(56) References Cited

U.S. PATENT DOCUMENTS

| | | | |
|---|---|---|---|
| 2002/0010911 A1* | 1/2002 | Cheng | G06F 8/443 717/128 |
| 2004/0205740 A1* | 10/2004 | Lavery | G06F 8/4441 717/151 |
| 2006/0048103 A1* | 3/2006 | Archambault | G06F 8/4442 717/131 |
| 2006/0130021 A1* | 6/2006 | Plum | G06F 11/3624 717/140 |
| 2007/0130140 A1* | 6/2007 | Cytron | G06F 16/90344 |
| 2007/0240137 A1* | 10/2007 | Archambault | G06F 8/4442 717/140 |
| 2008/0301256 A1* | 12/2008 | McWilliams | G06F 12/0284 709/214 |
| 2009/0282393 A1* | 11/2009 | Costa | G06F 21/52 717/132 |
| 2011/0307447 A1* | 12/2011 | Sabaa | H04L 67/2842 707/637 |
| 2013/0125097 A1* | 5/2013 | Ebcioglu | G06F 17/5045 717/136 |
| 2013/0132690 A1* | 5/2013 | Epstein | G06F 12/1416 711/159 |
| 2013/0346700 A1* | 12/2013 | Tomlinson | G06F 9/526 711/133 |
| 2014/0283040 A1* | 9/2014 | Wilkerson | G06F 21/52 726/22 |
| 2015/0036692 A1* | 2/2015 | Kirscht | H04L 49/15 370/412 |
| 2015/0160998 A1* | 6/2015 | Anvin | G06F 12/14 714/807 |
| 2016/0188476 A1* | 6/2016 | Yu | G06F 12/0862 711/137 |
| 2017/0091103 A1* | 3/2017 | Smelyanskiy | G06F 9/30018 |
| 2017/0177346 A1* | 6/2017 | Gokhale | G06F 12/0862 |
| 2017/0177349 A1* | 6/2017 | Yount | G06F 9/30029 |
| 2017/0177360 A1* | 6/2017 | Gokhale | G06F 9/30036 |
| 2017/0177361 A1* | 6/2017 | Anderson | G06F 9/30036 |
| 2017/0177363 A1* | 6/2017 | Yount | G06F 9/30036 |
| 2017/0185414 A1* | 6/2017 | Jin | G06F 9/30 |

OTHER PUBLICATIONS

Yuan-Shin Hwang et al., Runtime and Language Support for Compiling Adaptive Irregular Programs on Distributed-memory Machines, Jun. 1995, [Retrieved on Aug. 4, 2019]. Retrieved from the internet: <URL: https://onlinelibrary.wiley.com/doi/epdf/10.1002/spe.4380250603> 25 Pages (597-621) (Year: 1995).*

* cited by examiner

```
00:  enum states {
01:         STATE_0 = 0, STATE_1 = 1, STATE_2 = 2, STATE_3 = 3
02:  };
03:
04:  #define MAXSTATE 4
05:
06:  states board[19x19]
07:
08:  int state_increment(int color, int pos)
09:  {
10:  char statecount[MAXSTATE];
11:  int i;
12:  for(i=0;i<MAXSTATE;i++) statecount[i]=0;
13:
14:  /*f(color, position)will return any value between 0,
15:  MAXSTATE*/
16:
17:  m=f(color, position) ;
18:  statecount[board[m]]++;
19:  statecount[board[m+1]]++;
20:  statecount[board[m+2]]++;
21:  statecount[board[m+3]]++;
22:
23:
24:  if(statecount[STATE_0]>statecount[STATE_1])
25:  return 0;
26:  else if(statecount[STATE_2]>1)
27:  return 1;
28:  else if(statecount[STATE_3]>1)
29:  return 2;
30:  else
31:  return-1;
32:  }
```

500

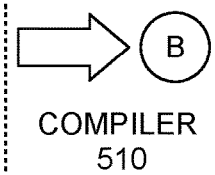

COMPILER 510

FIG. 5A

```
00: #define MAXSTATE 4
01: union bitstate {
02:   struct {
03:     char state_0:8;
04:     char state_1:8;
05:     char state_2:8;
06:     char state_3:8;
07:   } bitstate_rep;
08:   int int_rep;
09: }
10: enum states {
11:    STATE_0 = 0, STATE_1 = 1, STATE_2 = 2, STATE_3 = 3
12: };
13: //Decimal value of mask will look like {1, 256, 65536, 16777216}
14: int mask[] = {0x01, 0x0100, 0x010000, 0x01000000}
15:
16: states board[19x19];
17: int state_increment(int color, int pos)
18: {
19: bitstate statecount;
20: statecount.int_rep = 0
21:
22: int tempstate[MAXSTATE];
23:
24: /*f(color, position) will return any value between 0, MAXSTATE*/
25:
26: m=f(color, position);
27: tempstate[0]=mask[board[m]];
28: tempstate[1]=mask[board[m+1]];
29: tempstate[2]=mask[board[m+2]];
30: tempstate[3]=mask[board[m+3]];
31:
32: statecount.int_rep = tempstate[0] + tempstate[1] + tempstate[2] +
33: tempstate[3]
34:
35: if(statecount.bitstate_rep.state_0 > statecount.bitstate_rep.state_1)
36: return 0
37: else if(statecount.bitstate_rep.state_2 > 1)
38: return 1;
39: else if(statecount.bitstate_rep.state_3 > 1)
40: return2;
41: else
42: return-1;
43: }
```

B ⇒ COMPILER 510

```
00: union bitstate{
01:   struct {
02:     char state_0:8;
03:     char state_1:8;
04:     char state_2:8;
05:     char state_3:8;
06:     char state_4:8;
07:     char state_5:8;
08:     char state_6:8;
09:     char state_7:8;
10:   }bitstate_rep;
11:   int int_rep[2];
12: }
13:
14: //decimal value of mask will look like {1, 256, 65536, 16777216}
15: int mask[] = {0x01, 0x0100, 0x010000, 0x01000000}
16: #defineMAXSTATE8
17: enum states {STATE_0=0, STATE_1=1, STATE_2=2, STATE_3=3, STATE_4=4, STATE_5=5, STATE_6=6, STATE_7=7};
18: states board[19x19]
19: int state_increment(int color, int pos) {
20: int statebit[2][MAXSTATE/2];
21: bitstate statecount;
22: int val, bucket;
23: /*(color, position) will return any value between 0, MAXSTATE */
24: m=f(color, positio);
25: val=board[m];
26: bucket=val mod 4;
27: statebit[r][0]=mask[val];
    :
```

FIG. 6A

```
28: val=board[m+1];
29: bucket=val mod 4;
30: statebit[r][1]=mask[val];
31: val=board[m+2];
32: bucket=val mod 4;
33: statebit[r][2]=mask[val];
34: val=board[m+3];
35: bucket=val mod 4;
36: statebit[r][3]=mask[val];
37: statecount.int_rep[0]=statebit[0][0]+statebit[0][1]+statebit[0][2]+statebit[0][3];
38: statecount.int_rep[1]=statebit[1][0]+statebit[1][1]+statebit[1][2]+statebit[1][3];
39: if(statecount.bitstate_rep.state_0 > statecount.bitstate_rep.state_1)
40:   return 0;
41: else if(statecount.bitstate_rep.state_2 > 1)
42:   return 1;
43: else if(statecount.bitstate_rep.state_3 > 1)
44:   return 2;
45: else
46:   return -1;
47: }
48:
```

FIG. 6B

COMPILER OPTIMIZATION FOR INDIRECT ARRAY ACCESS OPERATIONS

BACKGROUND

The present invention relates to an improved compiler for computer source code, and more specifically, to replacing potentially inefficient sequence of indirect array accesses in computer source code.

Memory operations, including loads from memory and stores to memory, are generally time consuming and inefficient during execution of a computer program. Reducing the number of memory operations during execution of a computer program can improve the efficiency and speed of the computer program. Compilers can optimize the number of memory operations during execution of a program by combining multiple loads or stores into a single load or store. This can be done, for example, by replacing the original inefficient code portions in the source code with more efficient replacement code.

SUMMARY

Embodiments described herein include a method for compiling source code to reduce memory operations during execution. The method includes receiving, at a compiler, source code. The method further includes identifying, by the compiler, an indirect access array operation in the source code. The method further includes generating, by the compiler, replacement code for the indirect access array operation, the replacement code including a mask array and a union data structure. The method further includes generating modified code, using the compiler. The modified code modifies the source code to include the replacement code in place of the indirect access array operation.

Embodiments described herein further include a system. The system includes a processor and a memory. The memory containing a compiler program that, when executed on the processor, performs an operation. The operation includes receiving, at a compiler, source code. The operation further includes identifying, by the compiler, an indirect access array operation in the source code. The operation further includes generating, by the compiler, replacement code for the indirect access array operation, the replacement code including a mask array and a union data structure. The operation further includes generating modified code, using the compiler. The modified code modifies the source code to include the replacement code in place of the indirect access array operation.

Embodiments described herein further include a computer program product for compiling source code. The computer program product includes a computer-readable storage medium having computer-readable program code embodied therewith, the computer-readable program code executable by one or more computer processors to perform an operation. The operation includes receiving, at a compiler, source code. The operation further includes identifying, by the compiler, an indirect access array operation in the source code. The operation further includes generating, by the compiler, replacement code for the indirect access array operation, the replacement code including a mask array and a union data structure. The operation further includes generating modified code, using the compiler. The modified code modifies the source code to include the replacement code in place of the indirect access array operation.

BRIEF DESCRIPTION OF THE SEVERAL VIEWS OF THE DRAWINGS

FIGS. 5A-B are an illustration of sample code relating to replacement of an indirect array access sequence with a more efficient code sequence, according to an embodiment.

FIGS. 6A-B are an illustration of sample code relating to replacement of an indirect array access sequence that includes additional state variables, according to an embodiment.

DETAILED DESCRIPTION

Indirect array access sequences are common in programs where state variables are stored in arrays. As an example, some programs use buckets to record the number of occurrences of variables in various states while the program is executed. These state variables can be tracked using indirect array access sequences. During execution, these sequences result in a number of array loads from, and stores to, memory. This is because the indirect array access sequences rely on dynamic index computation, meaning that index values are calculated at run time based on variables stored in memory, and are stored back into memory after calculation and before the next operation.

As discussed above, the number of loads and stores during execution of a program can sometimes be reduced by optimizing the code when it is compiled. The compiler can replace the inefficient code sequences with alternate code that uses vectorization to combine multiple loads and stores into a single load or store. But typical compiler optimization processes do not work for programs with sequences of indirect array accesses, because the array index values are only known at runtime. Further, even if typical compiler optimization processes could be implemented for sequences of indirect array accesses, the return on investment would be very low—the overhead of setting up and using the necessary registers can override the benefit.

The number of loads and stores during execution of indirect array access sequences can instead be reduced by generating alternate code during compilation that uses a mask array and union data structure, among other improvements, and replacing the inefficient code with alternate code. The values of the mask array elements in the alternate code are determined by the characteristics of the state variables in the indirect array access sequences. The mask array encodes the number of variables in each state, so that during execution the application does not need to store the number of variables in each state in memory. This reduces the overall number of loads and stores during execution, thereby increasing the speed and efficiency of the underlying application during execution.

Reducing the number of loads and stores arising from these indirect array access sequences creates significant architectural benefits and improves the efficiency of the program. Further, replacing the indirect array access sequences with more efficient sequences avoids writes to memory followed by reads, which can be particularly inefficient. Such instructions that cause a memory write followed by a memory read can introduce hazards on certain architectures, to ensure that the operations are executed safely and that the read obtains the latest value updated by the write. Reducing the number of writes followed by reads improves the efficiency of programs executing in these architectures.

Figure 1:
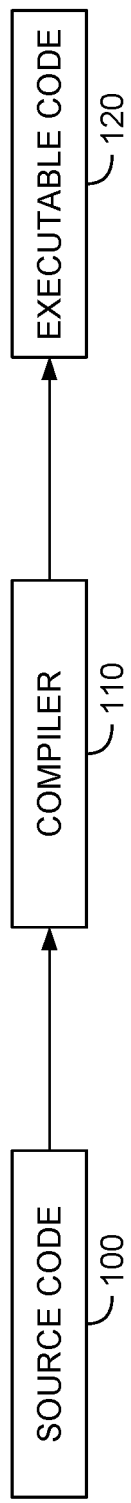
FIG. 1 is a flow chart illustrating compilation of source code into executable code, according to an embodiment.

FIG. 1 is a flow chart illustrating compilation of source code into executable code, according to an embodiment. As is well known to persons of ordinary skill in the art, many computer programs are written in human readable source code that is compiled into executable code to execute on a computer. As illustrated in FIG. 1, the source code 100 is source code for an example application. The source code 100 can be written in a programming language that is compiled before execution, for example C, C++, C#, Java, or numerous other programming languages. The compiler 110 is a computer program that takes in the source code 100 and outputs executable code 120. The compiler 110 can be any suitable compiler, for any suitable programming language and hardware architecture. In an embodiment, the compiler 110 includes multiple steps, including an intermediate code generation phase that includes at least one analysis pass or phase. This analysis pass can optimize the source code for execution by replacing relatively inefficient code sections with more efficient code sections. This can be done by, for example, detecting the inefficient code section, generating a more efficient but otherwise equivalent code section, and replacing the detected code section with the equivalent replacement section in the final executable code.

The executable code 120 is suitable for execution on a computer. In an embodiment, the executable code 120 can be machine code that is directly executable by the target computer. In another embodiment, the executable code 120 can be bytecode intended to be passed to an interpreter for execution (e.g., the Java virtual machine).

Figure 2A:
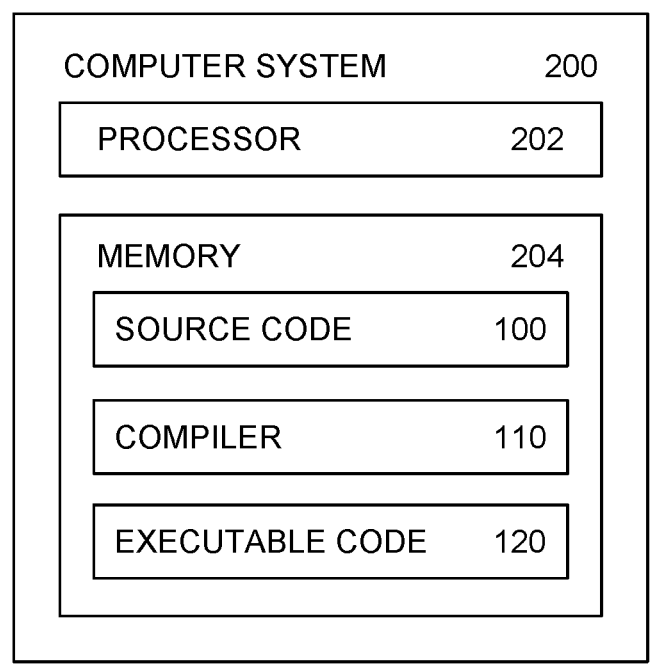
FIGS. 2A and 2B are block diagrams illustrating a computer system and a compiler, according to an embodiment.

FIG. 2A is a simplified block diagram illustrating a computer system 200 with a compiler 110, according to an embodiment. As discussed above, the source code 100 is human readable code that can be compiled into the executable code 120 by the compiler 110 before execution. The computer system 200 includes a processor 202. The processor 202 may be any computer processor capable of performing the functions described herein. Further, the processor 202 may be a single processor, multiple processors, a processor with a single core, a processor with multiple cores, or any other suitable configuration.

The computer system 200 further includes memory 204. Although memory 204 is shown as a single entity, the memory 204 may include one or more memory devices having blocks of memory associated with physical addresses, such as random access memory (RAM), read only memory (ROM), flash memory or other types of volatile and/or non-volatile memory. The memory 204 includes the compiler 110, the source code 100 and the executable code 120.

In an embodiment, the computer system 200 can be an individual computer. In another embodiment, the components of computer system 200 can be spread across a networked computer environment. For example, the source code 100 could be stored in a source code repository accessible via a communications network. The compiler 110 could be located on a server computer connected to the source code repository via the communications network. The compiler 110 could then store the executable code 120, after it is generated, on any suitable computer system, including a server computer, a source code repository or executable code repository, a local computer, or any other suitable computer system.

Figure 2B:
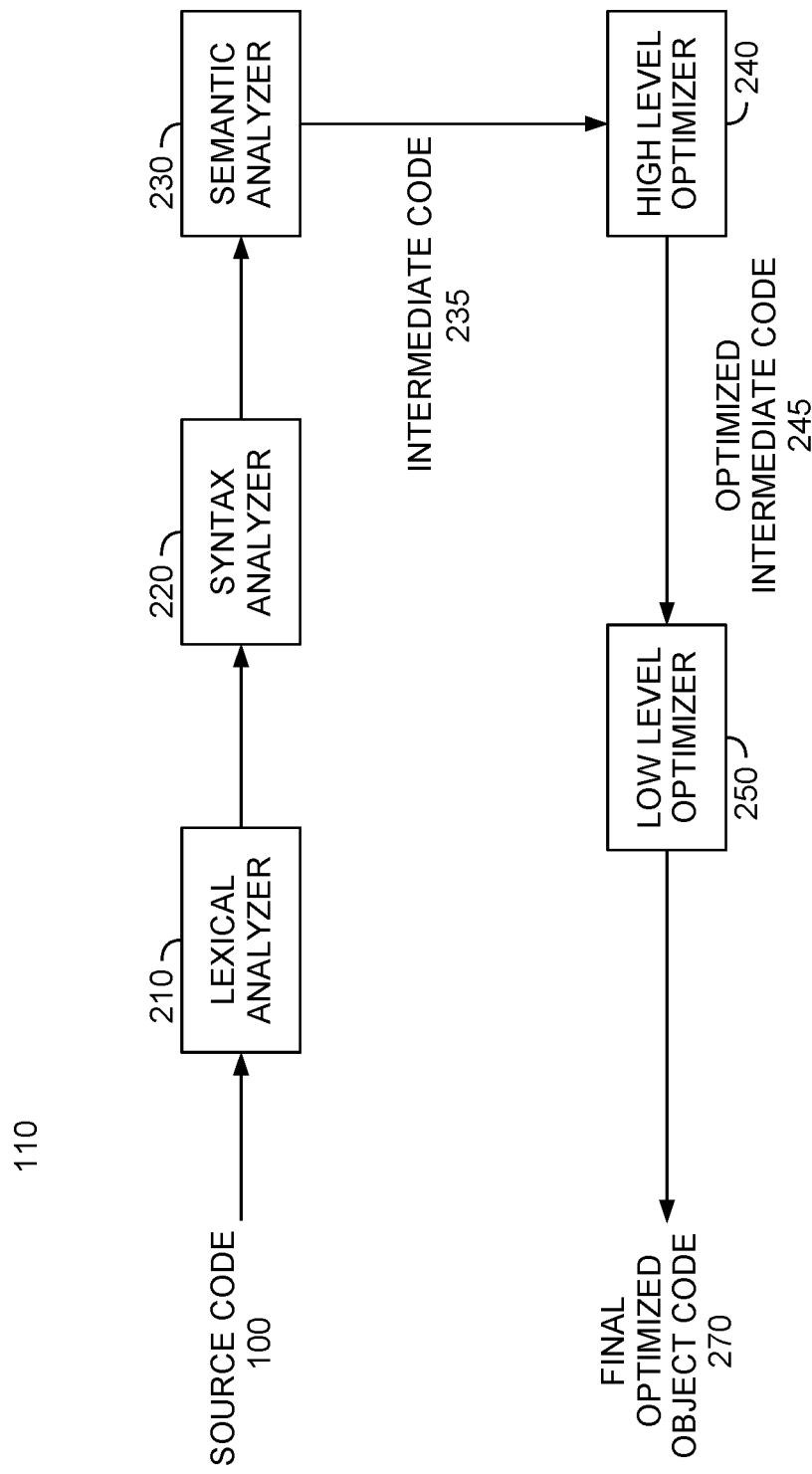

FIG. 2B is a block diagram illustrating a compiler 110, according to an embodiment. The compiler 110 can have a series of phases, 210-250. The source code 100 first passes through the lexical analyzer 210. The code is than passed to the syntax analyzer 220. In an embodiment, the compiler 110 identifies the indirect array access, as discussed further with regard to FIGS. 3-6, in the syntax analyzer 220. The code is then passed to the semantic analyzer 230. In an embodiment, the compiler 110 defines sizes and types for the replacement code in the semantic analyzer 230. The code is then passed to the high level optimizer 240. In an embodiment, the compiler 110 substitutes the originally identified code with the replacement code, as discussed further with regard to FIGS. 3-6, in the high level optimizer 240. In an embodiment, the high level optimizer 240 works at the level of intermediate representation of the source code 100 (e.g., intermediate code 235). For example, the high level optimizer 240 can work with three-address code, or another suitable intermediate representation of the source code 100. The high level optimizer 240 outputs optimized intermediate code 245 to the low level optimizer 250. The low level optimizer 250 then outputs final optimized object code 270. For example, the low level optimizer 250 can output the executable code 120. The above descriptions of tasks performed in the various compiler phases are examples only. A person of ordinary skill in the art will understand that the tasks described with respect to FIGS. 3-6 can be performed in any suitable compiler phase or combination of compiler phases.

Figure 3:
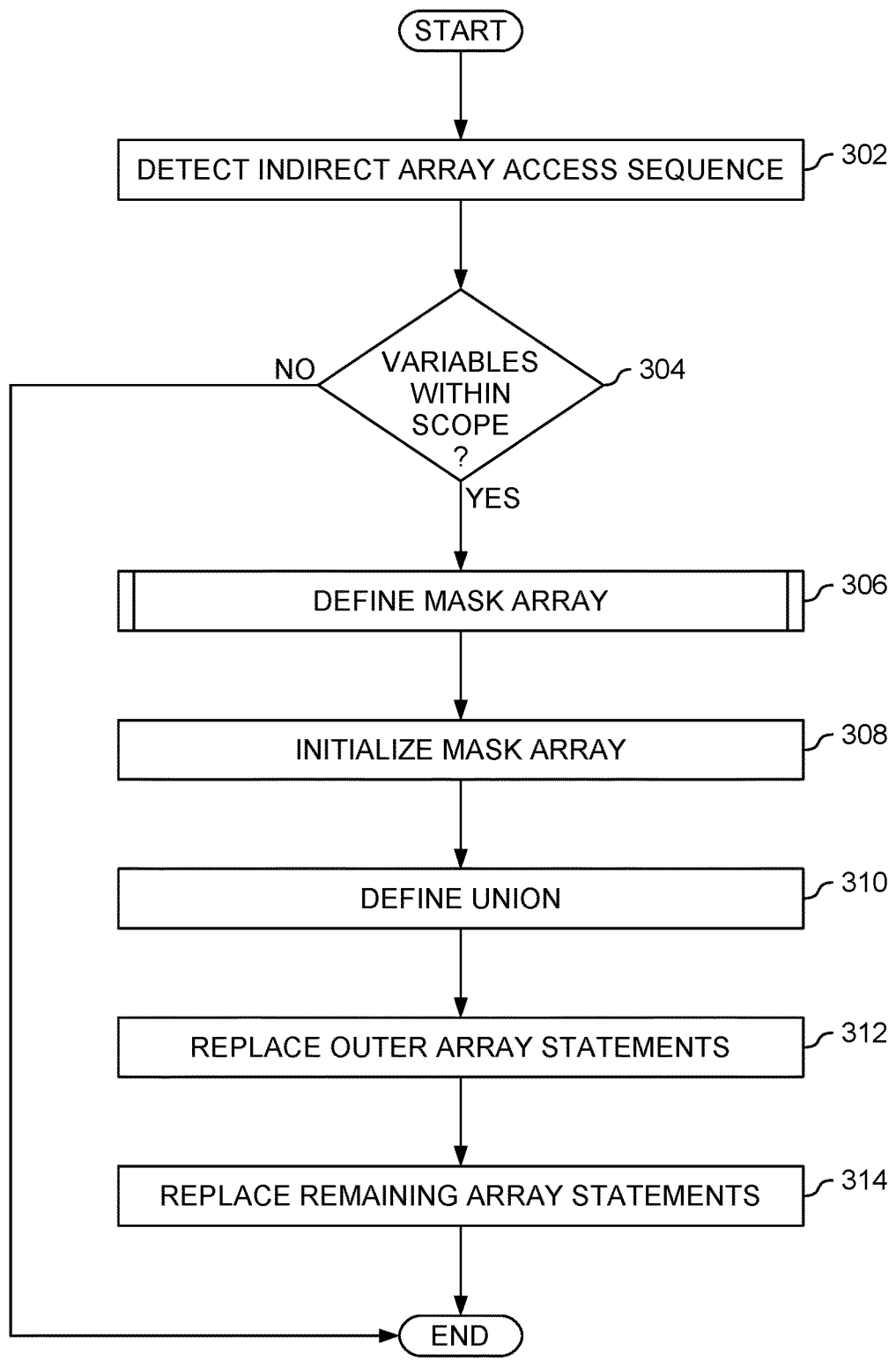
FIG. 3 is a flow chart illustrating replacement of an indirect array access sequence found in computer source code with a more efficient code sequence, during compilation of the computer source code, according to an embodiment.

FIG. 3 is a flow chart 300 illustrating replacement of an indirect array access sequence found in computer source code with a more efficient code sequence, during compilation of the computer source code, according to an embodiment. One way to improve the efficiency of a software application during execution is to replace inefficient source code with more efficient code during compilation of the source code. For example, as discussed in more detail with regard to FIG. 2B, a compiler (like the compiler 110 illustrated in FIGS. 1 and 2A-B), can include an intermediate code generation phase with an analysis pass that optimizes source code for execution. In an embodiment, the blocks illustrated in FIG. 3 can be performed during this analysis pass as part of an optimization process. For example, the blocks illustrated in FIG. 3 can be performed in the syntax analyzer 220, semantic analyzer 230, and high level optimizer 240 illustrated in FIG. 2B. In another embodiment, the blocks illustrated in FIG. 3 can be performed during another part of the intermediate code generation phase, or even during a different compilation phase altogether. In a further embodiment, the blocks illustrated in FIG. 3 can also be performed as part of a feedback-directed optimization phase that has information about the hotness of the routine which contains the indirect array sequence of interest. In this embodiment, for example, the optimization can be performed only if the hotness of the routine is beyond a pre-determined threshold.

At block 302, the compiler 110 detects an indirect array access sequence in the source code. For example, the compiler 110 detects the source code sequence: Array1[Array2[f(i, j, k)]]++. In this example, Array1 and Array2 are two arrays, f(i,j,k) is an arithmetic function of the variables i, j, k, and the variables i, j, k are program variables. This is just an example code sequence, and embodiments herein are not limited to detecting this sequence. For example, the program could include more (or fewer) program variables, a different array structure, etc. In the example, the compiler 110 can parse this code sequence to generate the productions:

Stmt→Assignment-stmt
Assignment-stmt→Array1[index-stmt]++
index-stmt→var|var1 op var2 op . . . |Array2[index-stmt]

In an embodiment, these productions can be used when detecting the indirect array access sequence. Further, the productions can be used in block 304, when the compiler checks the scope of the code sequence.

At block 304, the compiler 110 determines whether the variables within the detected code sequence are within the appropriate scope. In an embodiment, the compiler 110 checks whether the outer array variable in the identified indirect array access sequence is defined in the same function where it is used. For example, the compiler 110 checks whether Array1 is a local array defined in the same function as the operation detected in block 302. In other words, the compiler 110 checks whether Scope(Array 1)==Scope(Array 1.parentfunc), where parentfunc is the function in which Array1 is defined. If the scope matches, the compiler 110 proceeds to block 306. If the scope does not match, the compiler 110 ends the flow.

At block 306, the compiler 110 defines the mask array to be used to replace the indirect array access code sequence detected in block 302. This is described in more detail with regard to FIG. 4. In an embodiment, the compiler 110 defines the mask array such that its size is equal to the maximum number of states to be represented.

At block 308, the compiler 110 initializes the mask array. In one embodiment, the mask array is initialized so that each element in the array has an appropriate bit set to 1. The number of mask array elements and the size of each element of the mask array can be determined by two factors: (1) variable size of each array element and (2) the data size/vectorization capability supported by the processor architecture. For example, if the indirect array element variable is of type char, with four states, and the processor has the capability to support a 32 bit data-size, then we can create a mask array of size 32 bits to cover four representing states with four elements. In another example if we have 8 states and the processor architecture can support 64 bit data size operations, we can create a mask array of size 64 bits for covering 8 different states with eight variables. If the processor does not support 64 bit operations, to represent 8 states we can create a multidimensional array as discussed further with regard to FIG. 6.

At block 310, the compiler defines the union data structure to be used in the replacement code. In an embodiment, a union data structure includes multiple different variables that represent the same underlying value. For example, a union could include four 8 bit component variables and one 32 bit composite variable, with the 32 bit composite variable representing the same underlying value as the four 8 bit component variables combined.

In an embodiment, The union data structure can be a union of two data values: (1) N elements of a type that can hold a maximum state value T, and (2) the largest integer than can store N*T bits. For example, the union data structure can be a union of N elements (where N is the number of state variables) of type binaryType (as discussed with regard to FIG. 4, binaryType is a variable type that includes binarySize bits—for example, if binarySize is 8, binaryType is byte because a byte includes 8 bits) and the largest permissible integer data type for the particular computer that can store N*binarySize bits. For example, the union can be defined using the statement below:

typedef union {
    Struct {
        BinaryType state1;
        BinaryType state2;
        . . .
        BinaryType stateN;
    };
    Largest_integer_type intval;
}bitset;
Bitset Total_rep;

At block 312, the compiler replaces the outer array portion of the indirect array access sequence with the newly generated replacement. In an embodiment, the outer array statements involved in the read and write operations related to the indirect array sequence are replaced with the mask array and union operations. For example, Array1[Array2[f(i,j,k)]]++ is replaced with value1=maskArray[f(i,j,k)] and Array1[Array2[g(i,j,k)]]++ is replaced with value2=maskArray[g(i,j,k)]. After all of these outer array portions are replaced, the composite variable in the union (e.g., Total_rep.intval) is set to value1+value2+ . . . . At block 314, the remaining array statements that refer to individual states are replaced. For example, each sequence Array1[state1] is replaced with Total_rep.state1, the appropriate component variable from the union data structure.

Figure 4:
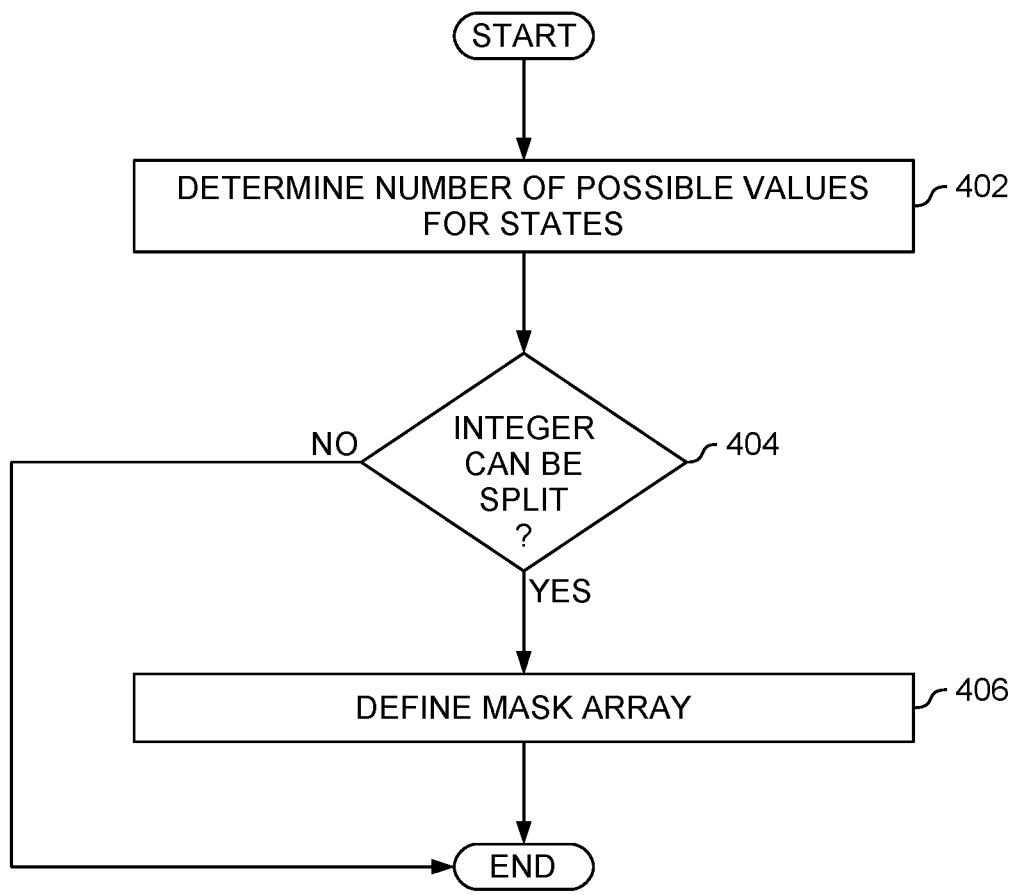
FIG. 4 is a flow chart illustrating defining a mask array as part of replacement of an indirect array access sequence with a more efficient code sequence, according to an embodiment.

FIG. 4 is a flow chart illustrating defining a mask array as part of replacement of an indirect array access sequence with a more efficient code sequence, according to an embodiment. In an embodiment, FIG. 4 illustrates a flow corresponding to block 306 in FIG. 3. At block 402, the compiler determines the number of possible state values (e.g., the number of possible values for the function f(i,j,k)). This can be determined, for example, by the type of Array2-Array2 holds the results of f(i,j,k), so the type of Array2 reflects how many values are possible for that function.

At block 404, the compiler 110 determines whether an integer variable can be divided to hold the desired state variables in the union data structure. For example, if 8 bits are required to represent the number of possible values for each state variable, and there are 4 state variables, 32 bits will be required to represent all four state variables. Each component variable should be 8 bits, while the composite variable should be 32 bits. At block 404, the compiler 110 determines whether an integer variable can be divided to represent all four state variables. In this example, the compiler 110 determines whether a 32 bit (or larger) integer variable type exists. If it does, the flow proceeds to block 406. If not, the flow exits.

At block 406, the compiler 110 defines a suitable mask array. In an embodiment, the array is of size S, where S is the number of state variables. Each element of the array is of type binaryType where, as discussed above in relation to block 310 of FIG. 3, binaryType is a variable type large enough to hold binarySize bits (e.g., if binarySize is 8, binaryType should include at least 8 bits). In an embodiment, the compiler 110 adds the details of the mask array to its symbol table for appropriate offset calculation. The mask array is then initialized, as discussed with regard to block 308 of FIG. 3, and the flow of FIG. 3 continues.

FIGS. 5A-B are an illustration of sample code relating to replacement of an indirect array access sequence with a more efficient code sequence, according to an embodiment. The code section 500 illustrates an example of an indirect array access sequence that can result in undesired loads and stores during execution. A compiler 510 (e.g., the compiler 110) processes the code section 500 and generates replacement code 520, which reduces the number of undesired loads and stores during execution through use of a mask array and union data structure.

For example, applying the blocks of FIG. 3, at block 302 the compiler 510 detects the indirect array access sequence reflected in lines 18-21 of the source code 500. At block 304, the compiler 510 then checks the scope of the array state-count[ ] to make sure the array is defined within the state_increment( ) function. It is, so the flow continues. At block 306, the compiler 510 defines an appropriate mask array. In the example illustrated in FIG. 5B, the compiler 510 defines the array mask[ ] as an integer array with four elements, illustrated at line 14 of the replacement code sequence 520. At block 308, the compiler 510 initializes the mask array with suitable values—in this example, the array mask[ ] is initialized with the values {0x01,0x0100, 0x010000,0x01000000} or {1, 256, 65536, 16777216} to place a 1 in the correct location in each variable (e.g., the first bit, the $8^{th}$ bit, the $16^{th}$ bit, etc.).

At block 310, the compiler 510 defines a suitable union data structure. In the example illustrated in FIG. 5B, the compiler 510 defines the union data structure illustrated at lines 1-9 of the replacement code 520. At block 312, the compiler 510 replaces the outer array operations. In this example, the array operations found at lines 18-21 of the source code 500 are replaced with the variable assignments illustrated at lines 27-33 in the replacement code 520. At block 314 the compiler 510 replaces the remaining array statements. In the example illustrated in FIG. 5B, the compiler 510 replaces the array statements at lines 24, 26, and 28 in the source code 500 with the statements at lines 35, 37, and 39 in the replacement code 520.

FIGS. 6A-B are an illustration of sample code relating to replacement of an indirect array access sequence that includes eight state variables with a more efficient code sequence, according to an embodiment. The sample code illustrated in FIGS. 5A-B addresses an example embodiment in which the code to be replaced uses four state variables. But embodiments herein are not limited to four variables. The embodiments described can be extended to any number of state variables.

As an example, FIG. 6 illustrates sample replacement code for an indirect array access sequence that uses eight state variables. In this example, the union data structure is modified to include an array of two integers, rather than a single integer. For example, the integer array int_rep defined at line 11 in FIG. 6. Each integer can be used to represent four state variables (assuming each state variable can be represented with 8 bits), so an array of two integers can represent eight state variables. This solution can be extended to an array of any suitable size and type, and can therefore replace any number of state variables.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the compiler 110) or related data available in the cloud. For example, the compiler 110 could execute on a computing system in the cloud and generate the executable code 120. In such a case, the compiler 110 could compile source code 100 and store executable code 120 at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for compiling source code to reduce memory operations during execution, comprising:
   receiving, at a compiler, source code comprising an indirect access array operation;
   executing the compiler to generate executable code for a computer architecture based on the source code, the execution of the compiler comprising:
   identifying the indirect access array operation in the source code;
   defining a mask array comprising a size corresponding to the indirect access array operation;

defining, based on the indirect access array operation, a union data structure comprising a plurality of component variables and a composite variable corresponding to the indirect access array operation;

generating replacement code for replacing the indirect access array operation, the replacement code comprising the mask array and the union data structure; and generating the executable code, the executable code corresponding to modified code that modifies the source code to include the replacement code in place of the indirect access array operation.

2. The method of claim 1, wherein execution of a first program defined by first executable code corresponding to the modified code results in fewer memory operations than execution of a second program defined by second executable code corresponding to the source code, and wherein the first executable code and the second executable code are both executable in a same computer architecture comprising a same instruction set.

3. The method of claim 2, wherein execution of the second program results in one or more memory store operations followed by memory load operations, related to the indirect access array operation, and wherein execution of the first program eliminates at least one of the memory store operations followed by memory load operations.

4. The method of claim 1, wherein the indirect access array operation comprises an index calculation in which an index of the array is determined dynamically at runtime.

5. The method of claim 4, wherein the replacement code replaces a first operation comprising index computation and an array access with a second operation comprising the mask array.

6. The method of claim 5, wherein the second operation further comprises assigning a value from the mask array to a first variable.

7. The method of claim 6, wherein the composite variable represents the same underlying value as a combination of the plurality of component variables.

8. The method of claim 7, wherein the replacement code comprises an operation in which a value related to the first variable is assigned to the composite variable of the union data structure.

9. The method of claim 7, wherein the indirect access array operation comprises a plurality of state variables, and wherein in the modified code a reference to a state variable of the plurality of state variables is replaced with a reference to a component variable of the plurality of component variables in the union data structure.

10. A system, comprising:
a processor; and
a memory containing a compiler program that, when executed on the processor, performs an operation, the operation comprising:
receiving, at the compiler, source code comprising an indirect access array operation;
executing the compiler to generate executable code for a computer architecture based on the source code, the execution of the compiler comprising:
identifying the indirect access array operation in the source code;
defining a mask array comprising a size corresponding to the indirect access array operation;
defining, based on the indirect access array operation, a union data structure comprising a plurality of component variables and a composite variable corresponding to the indirect access array operation;

generating replacement code for replacing the indirect access array operation, the replacement code comprising the mask array and the union data structure; and generating the executable code, the executable code corresponding to modified code that modifies the source code to include the replacement code in place of the indirect access array operation.

11. The system of claim 10, wherein execution of a first program defined by first executable code corresponding to the modified code results in fewer memory operations than execution of a second program defined by second executable code corresponding to the source code, and wherein the first executable code and the second executable code are both executable in a same computer architecture comprising a same instruction set.

12. The system of claim 11, wherein execution of the second program results in one or more memory store operations followed by memory load operations, related to the indirect access array operation, and wherein execution of the first program eliminates at least one of the memory store operations followed by memory load operations.

13. The system of claim 10, wherein the indirect access array operation comprises an index calculation in which an index of the array is determined at runtime, wherein the replacement code replaces a first operation comprising index computation and an array access with a second operation comprising the mask array, and wherein the second operation further comprises assigning a value from the mask array to a first variable.

14. The system of claim 13, wherein the composite variable represents the same underlying value as a combination of the plurality of component variables, and wherein the replacement code comprises an operation in which a value related to the first variable is assigned to the composite variable of the union data structure.

15. The system of claim 14, wherein the indirect access array operation comprises a plurality of state variables, and wherein in the modified code a reference to a state variable of the plurality of state variables is replaced with a reference to a component variable of the plurality of component variables in the union data structure.

16. A computer program product for compiling source code, the computer program product comprising:
a computer-readable storage medium having computer-readable program code embodied therewith, the computer-readable program code executable by one or more computer processors to perform an operation, the operation comprising:
receiving, at a compiler, source code comprising an indirect access array operation;
executing the compiler to generate executable code for a computer architecture based on the source code, the execution of the compiler comprising:
identifying the indirect access array operation in the source code;
defining a mask array comprising a size corresponding to the indirect access array operation;
defining, based on the indirect access array operation, a union data structure comprising a plurality of component variables and a composite variable corresponding to the indirect access array operation;
generating replacement code for replacing the indirect access array operation, the replacement code comprising the mask array and the union data structure; and generating the executable code, the executable code corresponding to modified code that modifies the source code to include the replacement code in place of the indirect access array operation.

17. The computer program product of claim 16, wherein execution of a first program defined by first executable code corresponding to the modified code results in fewer memory operations than execution of a second program defined by second executable code corresponding to the source code, and wherein the first executable code and the second executable code are both executable in a same computer architecture comprising a same instruction set.

18. The computer program product of claim 17, wherein execution of the second program results in one or more memory store operations followed by memory load operations, related to the indirect access array operation, and wherein execution of the first program eliminates at least one of the memory store operations followed by memory load operations.

19. The computer program product of claim 16, wherein the indirect access array operation comprises a two-dimensional array in which an index of the array is determined at runtime, wherein the replacement code replaces a first operation comprising the two-dimensional array with a second operation comprising the mask array, wherein the second operation further comprises assigning a value from the mask array to a first variable, wherein the composite variable represents the same underlying value as a combination of the plurality of component variables, and wherein the replacement code comprises an operation in which a value related to the first variable is assigned to the composite variable of the union data structure.

20. The method of claim 1, wherein the indirect access array operation comprises a plurality of state variables and wherein the size corresponds to the plurality of state variables.

* * * * *